(12) United States Patent
Inoue (10) Patent No.: US 10,735,091 B2
(45) Date of Patent: Aug. 4, 2020

(54) OPTICAL TRANSMISSION SYSTEM, CONTROL APPARATUS OF WAVELENGTH SELECTIVE SWITCH, AND INSERTION LOSS CORRECTION METHOD

(71) Applicant: NEC Corporation, Minato-ku, Tokyo (JP)

(72) Inventor: Takanori Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 12 days.

(21) Appl. No.: 16/079,193

(22) PCT Filed: Feb. 9, 2017

(86) PCT No.: PCT/JP2017/004785
§ 371 (c)(1),
(2) Date: Aug. 23, 2018

(87) PCT Pub. No.: WO2017/154454
PCT Pub. Date: Sep. 14, 2017

(65) Prior Publication Data
US 2019/0052356 A1    Feb. 14, 2019

(30) Foreign Application Priority Data
Mar. 10, 2016   (JP) .................. 2016-046558

(51) Int. Cl.
*H04J 14/00*   (2006.01)
*H04B 10/077*  (2013.01)
*H04J 14/02*   (2006.01)

(52) U.S. Cl.
CPC ....... *H04B 10/0775* (2013.01); *H04B 10/077* (2013.01); *H04J 14/02* (2013.01); *H04B 2210/07* (2013.01)

(58) Field of Classification Search
CPC .................. H04B 10/0775; H04B 14/02
See application file for complete search history.

(56) References Cited

U.S. PATENT DOCUMENTS 5,970,201 A * 10/1999 Anthony .......... H04B 10/07955
                                                    385/140
6,327,076 B1 * 12/2001 Akiyama ........... H04B 10/2942
                                                    359/337.11
(Continued)

FOREIGN PATENT DOCUMENTS

CN     103326773 A    9/2013
JP     2007-148042 A  6/2007
(Continued)

OTHER PUBLICATIONS

International Search Report for PCT Application No. PCT/JP2017/004785, dated Apr. 25, 2017.
(Continued)

*Primary Examiner* — David C Payne
*Assistant Examiner* — Pranesh K Barua (57) ABSTRACT

A multiplexer inserts a dummy signal light into a main signal. A light intensity monitor acquires the intensity of the light of each wavelength of a light output from a wavelength selective switch. A light source controller controls the insertion of the dummy signal light into the main signal, and release of the insertion. A difference calculator calculates the difference between a first light intensity that has been acquired in a state in which the dummy signal light is inserted into the main signal and a second light intensity that has been acquired in a state in which the dummy signal light is not inserted into the main signal. An insertion loss calculator calculates an insertion loss in the wavelength selective switch based on the calculated difference. An insertion loss controller controls the insertion loss in the wavelength selective switch based on the calculated insertion loss.

9 Claims, 10 Drawing Sheets

(56) References Cited

U.S. PATENT DOCUMENTS

| | | | | |
|---|---|---|---|---|
| 6,333,805 B1* | 12/2001 | Kamata | G01J 1/26 | 250/205 |
| 6,594,046 B1* | 7/2003 | Nishino | H04B 10/2941 | 359/239 |
| 6,597,480 B1* | 7/2003 | Iida | H04B 10/67 | 398/141 |
| 10,025,034 B1* | 7/2018 | Sakurai | G02B 6/29313 | |
| 2001/0033411 A1* | 10/2001 | Shiota | H01S 3/06758 | 359/333 |
| 2002/0149840 A1* | 10/2002 | So | H01S 3/1003 | 359/337.1 |
| 2004/0161234 A1* | 8/2004 | Ozawa | H04B 10/077 | 398/33 |
| 2005/0078355 A1* | 4/2005 | Yoshida | H01S 3/06754 | 359/334 |
| 2005/0100343 A1* | 5/2005 | Yoshida | H04B 10/2916 | 398/177 |
| 2006/0291867 A1* | 12/2006 | Tamura | G02F 1/3515 | 398/152 |
| 2007/0196107 A1* | 8/2007 | Takita | G02B 6/359 | 398/45 |
| 2010/0135672 A1* | 6/2010 | Takahashi | H04B 10/25133 | 398/182 |
| 2010/0272441 A1* | 10/2010 | Boduch | H04J 14/0206 | 398/83 |
| 2011/0076009 A1* | 3/2011 | Sato | G02B 6/3588 | 398/1 |
| 2012/0263459 A1* | 10/2012 | Komiya | H04B 10/07955 | 398/34 |
| 2014/0286635 A1* | 9/2014 | Kaneko | H04B 10/0799 | 398/34 |
| 2014/0348464 A1* | 11/2014 | Kamura | H04B 10/0775 | 385/16 |
| 2015/0132009 A1* | 5/2015 | Yuki | H04J 14/0212 | 398/135 |
| 2015/0381274 A1* | 12/2015 | Archambault | H04Q 9/00 | 398/28 |
| 2016/0050021 A1* | 2/2016 | Hua | H04B 10/07955 | 398/38 |
| 2017/0279528 A1* | 9/2017 | Huang | H04B 10/548 | |

FOREIGN PATENT DOCUMENTS

| | | |
|---|---|---|
| JP | 2012-222747 A | 11/2012 |
| JP | 2015-095808 A | 5/2015 |
| WO | 2013/140493 A1 | 9/2013 |

OTHER PUBLICATIONS

Chinese Office Action for CN Application No. 201780014292.6 dated Sep. 24, 2019 with English Translation.

* cited by examiner

OPTICAL TRANSMISSION SYSTEM, CONTROL APPARATUS OF WAVELENGTH SELECTIVE SWITCH, AND INSERTION LOSS CORRECTION METHOD

This application is a National Stage Entry of PCT/JP2017/004785 filed on Feb. 9, 2017, which claims priority from Japanese Patent Application 2016-046558 filed on Mar. 10, 2016, the contents of all of which are incorporated herein by reference, in their entirety.

TECHNICAL FIELD

The present disclosure relates to an optical transmission system, and more particularly, to an optical transmission system that includes a wavelength selective switch. Further, the present disclosure relates to a control apparatus of the wavelength selective switch and an insertion loss correction method in the wavelength selective switch.

BACKGROUND ART

In recent years, a wavelength division multiplexing (WDM) communication has been known as a communication method that achieves a large volume data communication. In the wavelength division multiplexing communication, a plurality of optical signals having wavelengths different from one another are multiplexed and then transmitted. The wavelength division multiplexing communication is used also for a long distance optical transmission system such as an optical submarine cable system.

In order to obtain uniform transmission characteristics for the entire transmission band in the long distance optical transmission system such as the optical submarine cable system, management of the wavelength dependency of an insertion loss that an apparatus arranged in a transmission path and components of this apparatus have is important. A reconfigurable optical add/drop multiplexer (ROADM) function capable of dynamically changing the path route of the network has recently been applied also to the optical submarine cable system. A wavelength selective switch is known as an optical device that achieves the ROADM function.

Regarding the wavelength selective switch, Patent Literature 1 discloses an optical transmission apparatus in which a wavelength selective switch is used along with an optical channel monitor (OCM). In Patent Literature 1, the optical channel monitor includes a wavelength dividing unit and an intensity detector. The wavelength dividing unit includes a wavelength tunable filter that allows an optical signal of a specific wavelength to pass therethrough, and divides the optical signal for each wavelength. The intensity detector includes a light-receiving device. The intensity detector receives optical signals that have been divided by the wavelength dividing unit and detects the light intensity of the optical signal for each wavelength. The optical transmission apparatus disclosed in Patent Literature 1 controls the amount of attenuation for each wavelength in the wavelength selective switch in such a way that the intensity detected for each wavelength using the optical channel monitor reaches a target value.

CITATION LIST

Patent Literature

[Patent Literature 1] Japanese Unexamined Patent Application Publication No. 2012-222747

SUMMARY OF INVENTION

Technical Problem

The insertion loss characteristics of the wavelength selective switch have a wavelength dependency. In order to obtain a flat insertion loss on an output side of the wavelength selective switch or to obtain the insertion loss having a desired profile on the output side of this switch, an additional insertion loss that can be set for every single wavelength band is generally adjusted. Further, the wavelength characteristics of the insertion loss of the wavelength selective switch are changed depending on the environmental temperature of the place where the wavelength selective switch is installed. It is known to dynamically correct the insertion loss in accordance with the actual environmental temperature by acquiring, for the wavelength selective switch itself or an apparatus into which the wavelength selective switch is incorporated, the wavelength dependency of the wavelength loss at each temperature, and referring to a temperature versus insertion loss wavelength dependency table that shows these acquired wavelength dependencies.

However, in order to maintain the uniformity of the insertion loss with high accuracy at any environmental temperature or to maintain the desired profile thereof, it is required to increase (make fine) the temperature resolution (intervals between acquired temperatures) of the temperature versus insertion loss wavelength dependency table. Since each wavelength selective switch has a different wavelength dependency, creating the aforementioned table for all the wavelength selective switches or the apparatuses in which the wavelength selective switches are incorporated causes an increase in the size of a storage apparatus that stores this information. Furthermore, in the aforementioned table acquired before shipment, it is impossible to correct fluctuations due to aged deterioration and the like.

The optical transmission apparatus disclosed in Patent Literature 1 focuses on the level of a main signal and controls the amount of attenuation for each wavelength in the wavelength selective switch in such a way that the intensity of the main signal reaches the target value. In this case, even when the intensity profile for each wavelength of the main signal is changed in the input end of the wavelength selective switch, the main signal is output at a constant intensity profile in the output end of the wavelength selective switch. This means that even when the output is changed in the transmitter that outputs the main signal, the light intensity is not changed in the output end of the wavelength selective switch. In the optical submarine cable system, the intensity of the main signal for each wavelength is adjusted in each transmitter in such a way that the optical signal-to-noise ratio (OSNR) for each wavelength in the receiving end becomes flat. In Patent Literature 1, the main signal is output at a constant intensity profile in the output end of the wavelength selective switch. Accordingly, the optical transmission apparatus disclosed in Patent Literature 1 cannot be applied to the submarine cable system.

The present disclosure has been made in view of the aforementioned circumstances, and aims to provide an optical transmission system, a control apparatus of a wavelength selective switch, and an insertion loss correction method capable of correcting the wavelength dependency of the insertion loss characteristics, the environmental temperature dependency, and the aged deterioration of the wavelength selective switch during the operation of the wavelength selective switch.

Solution to Problem

In order to accomplish the aforementioned object, the present disclosure provides an optical transmission system including: a wavelength selective switch; a light source configured to generate a dummy signal light; a multiplexer configured to multiplex a main signal in which optical signals having a plurality of wavelengths are multiplexed with the dummy signal light, and output the main signal into which the dummy signal light is inserted to the wavelength selective switch; a light intensity monitor configured to acquire the intensity of the light of each wavelength of a light output from the wavelength selective switch; light source control means for controlling the insertion of the dummy signal light into the main signal and release of the insertion; difference calculation means for calculating the difference between a first light intensity that the light intensity monitor has acquired in a state in which the dummy signal light is inserted into the main signal and a second light intensity that the light intensity monitor has acquired in a state in which the dummy signal light is not inserted into the main signal; insertion loss calculation means for calculating an insertion loss in the wavelength selective switch based on the result of the calculation in the difference calculation means; and insertion loss control means for controlling the insertion loss in the wavelength selective switch based on the insertion loss that has been calculated.

The present disclosure further provides a control apparatus of a wavelength selective switch including: a light source configured to generate a dummy signal light; a multiplexer configured to multiplex a main signal in which optical signals having a plurality of wavelengths are multiplexed with the dummy signal light, and output the main signal into which the dummy signal light is inserted to a wavelength selective switch; a light intensity monitor configured to acquire the intensity of the light of each wavelength of a light output from the wavelength selective switch; light source control means for controlling the insertion of the dummy signal light into the main signal and release of this insertion; difference calculation means for calculating the difference between a first light intensity that the light intensity monitor has acquired in a state in which the dummy signal light is inserted into the main signal and a second light intensity that the light intensity monitor has acquired in a state in which the dummy signal light is not inserted into the main signal; insertion loss calculation means for calculating an insertion loss in the wavelength selective switch based on the result of the calculation in the difference calculation means; and insertion loss control means for controlling the insertion loss in the wavelength selective switch based on the insertion loss that has been calculated.

The present disclosure provides an insertion loss correction method including: multiplexing a main signal in which optical signals having a plurality of wavelengths are multiplexed with a dummy signal light, and output the main signal into which the dummy signal light is inserted to a wavelength selective switch; acquiring a first light intensity of each wavelength of a light output from the wavelength selective switch in a state in which the dummy signal light is inserted into the main signal; inputting the main signal to the wavelength selective switch; acquiring a second light intensity of each wavelength of the light output from the wavelength selective switch in a state in which the dummy signal light is not inserted into the main signal; calculating a difference between the first light intensity and the second light intensity; calculating an insertion loss in the wavelength selective switch based on the difference; and controlling the insertion loss in the wavelength selective switch based on the insertion loss that has been calculated.

Advantageous Effects of Invention

The optical transmission system, the control apparatus of the wavelength selective switch, and the insertion loss correction method according to the present disclosure are capable of correcting the wavelength dependency of the insertion loss characteristics, the environmental temperature dependency, and the deterioration of the wavelength selective switch during the operation of the wavelength selective switch.

DESCRIPTION OF EMBODIMENTS

Figure 1:
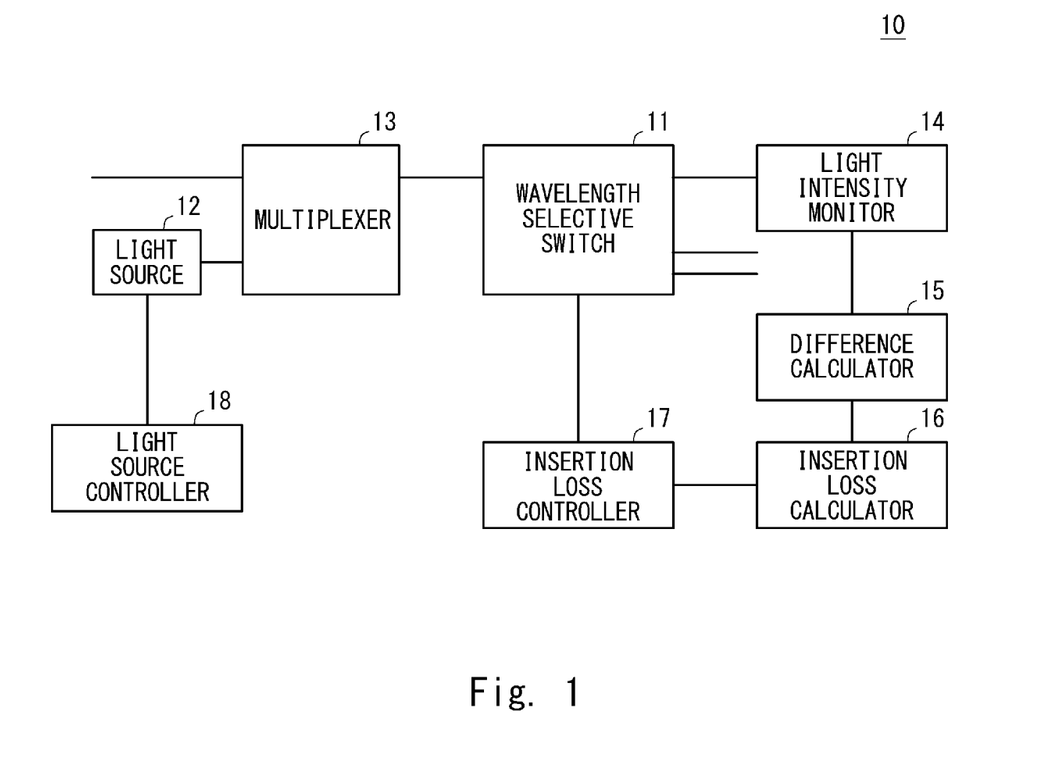
FIG. 1 is a block diagram showing an optical transmission system according to the present disclosure.

Prior to giving a description of an embodiment of the present disclosure, an outline of the present disclosure will be given first. FIG. 1 shows an optical transmission system according to the present disclosure. An optical transmission system 10 according to the present disclosure includes a wavelength selective switch 11, a light source 12, a multiplexer 13, a light intensity monitor 14, a difference calculator 15, an insertion loss calculator 16, an insertion loss controller 17, and a light source controller 18. The light source 12, the multiplexer 13, the light intensity monitor 14, the difference calculator 15, the insertion loss calculator 16, the insertion loss controller 17, and the light source controller 18 correspond to the control apparatus of the wavelength selective switch 11.

The wavelength selective switch 11 receives a wavelength division multiplexing (WDM) signal (main signal) obtained by multiplexing optical signals having a plurality of wavelengths. The light source 12 generates a dummy signal light. The multiplexer 13 multiplexes the main signal and the dummy signal light, inserts the dummy signal light into the main signal, and outputs the obtained signal to the wavelength selective switch 11.

The light intensity monitor 14 acquires the intensity of the light of each wavelength of the light output from the wavelength selective switch 11. When the wavelength selective switch 11 includes a plurality of light output ports, a plurality of the light intensity monitors 14 may be arranged to correspond to the plurality of the respective light output ports. The light source controller 18 controls the insertion of the dummy signal light into the main signal and release of this insertion. The difference calculator 15 calculates the difference between a first light intensity of each wavelength that the light intensity monitor 14 has acquired in a state in which the dummy signal light is inserted into the main signal and a second light intensity of each wavelength that the light intensity monitor 14 has acquired in a state in which the dummy signal light is not inserted into the main signal. The insertion loss calculator 16 calculates the insertion loss for each wavelength in the wavelength selective switch based on the result of the calculation in the difference calculator 15. The insertion loss controller 17 controls the insertion loss (additional insertion loss) in the wavelength selective switch 11 for each wavelength based on the insertion loss for each wavelength that has been calculated.

In the optical transmission system according to the present disclosure, the light intensity monitor 14 acquires the first light intensity of each wavelength of the main signal into which the dummy signal light has been inserted by the multiplexer 13 and the second light intensity of each wavelength of the main signal into which the dummy signal light has not been inserted on the output side of the wavelength selective switch 11. By calculating the difference between the first light intensity and the second light intensity, it is possible to calculate the light intensity of each wavelength of the dummy signal light after it has passed through the wavelength selective switch 11. When the optical spectrum of the dummy signal light multiplexed in the multiplexer 13 is known, it is possible to estimate the insertion loss of each wavelength in the wavelength selective switch 11 based on the light intensity of each wavelength of the dummy signal light after it has passed through the wavelength selective switch 11.

In general, the insertion loss characteristics of the wavelength selective switch 11 have a wavelength dependency. Further, this wavelength dependency is changed depending on the environmental temperature. Further, the wavelength dependency may be changed with time due to aged deterioration and the like. In the present disclosure, the insertion loss of each wavelength in the wavelength selective switch 11 is estimated using the dummy signal light. By controlling the insertion loss of the wavelength selective switch 11 based on the result of the above estimation, it is possible to correct the wavelength dependency of the insertion loss characteristics, the environmental temperature dependency, and aged deterioration of the wavelength selective switch 11 during the operation of the wavelength selective switch 11.

Figure 2:
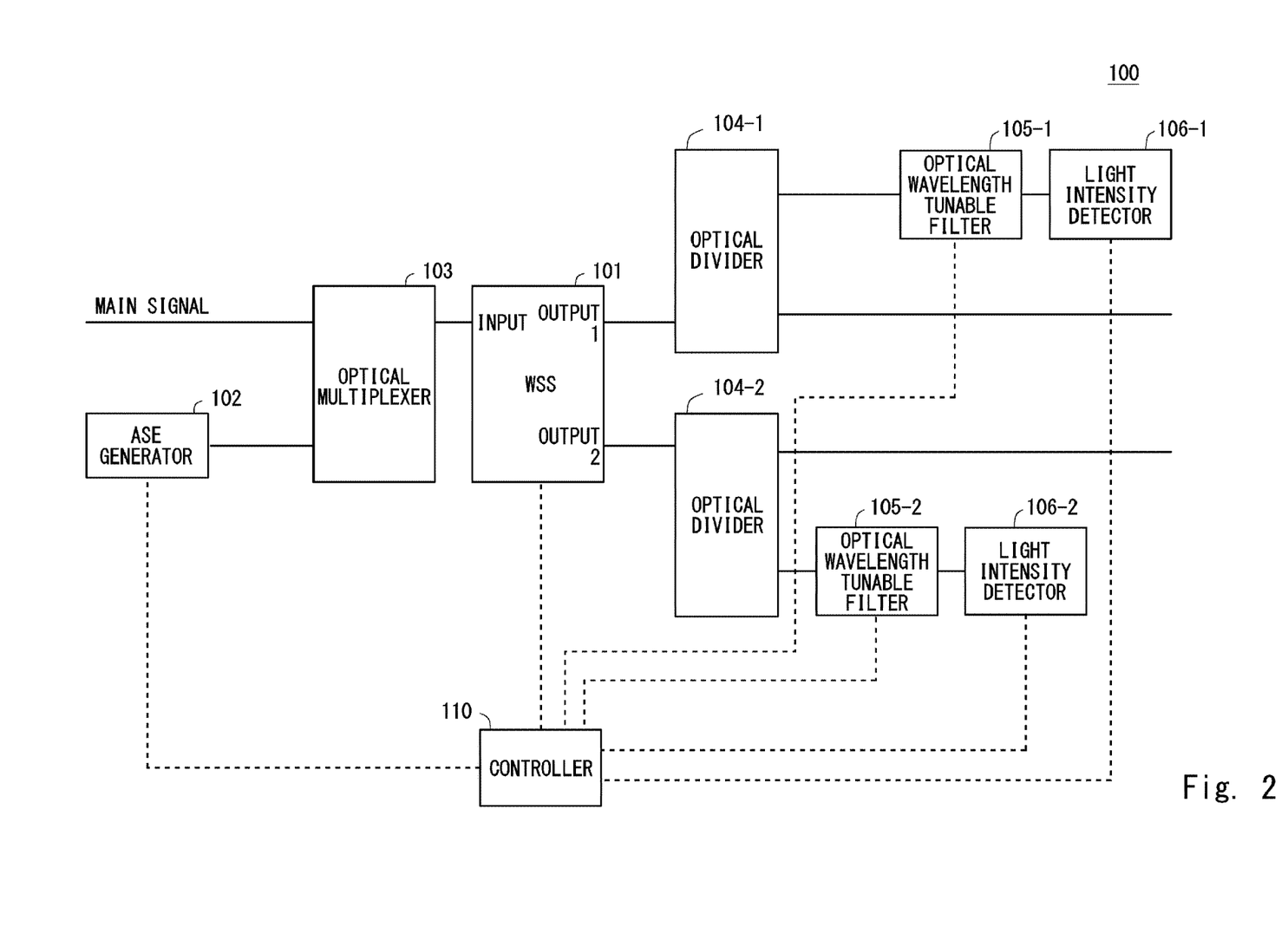
FIG. 2 is a block diagram showing an optical transmission system according to one embodiment of the present disclosure.

In the following description, with reference to the drawings, the embodiment of the present disclosure will be explained. FIG. 2 shows an optical transmission system according to one embodiment of the present disclosure. An optical transmission system 100 includes a wavelength selective switch 101, an ASE generator 102, an optical multiplexer 103, optical dividers 104-1 and 104-2, optical wavelength tunable filters 105-1 and 105-2, light intensity detectors 106-1 and 106-2, and a controller 110. The optical transmission system 100 forms a part of a wavelength division multiplexing communication system. The optical transmission system 100 is used, for example, for an optical submarine cable system.

The wavelength selective switch (WSS) 101 is an optical switch that has a wavelength multiplexing/demultiplexing function for connecting an input WDM signal (main signal) to different light output ports for different wavelengths and is configured to be able to change the combination of the wavelength with the light output port. The wavelength selective switch 101 includes, for example, one light input port and a plurality of light output ports. While the wavelength selective switch 101 includes two light output ports in FIG. 2, the number of light output ports is not particularly limited, and the wavelength selective switch 101 may include three or more light output ports or may include one light output port.

The Amplified Spontaneous Emission (ASE) generator 102 and the optical multiplexer 103 are arranged in the previous stage of the input part of the wavelength selective switch 101. The ASE generator 102, which is an ASE light source, generates an ASE light (a dummy signal light). An optical amplifier such as an erbium doped fiber amplifier (EDFA) in the state in which the light is not input is, for example, used as the ASE generator 102. The ASE generator 102 corresponds to the light source 12 shown in FIG. 1.

The optical multiplexer 103 multiplexes the main signal to be input to the wavelength selective switch 101 with the ASE light. In other words, the optical multiplexer 103 inserts the ASE light into the main signal. The optical multiplexer 103 corresponds to the multiplexer 13 in FIG. 1. The wavelength band of the ASE light (ASE signal) generated by the ASE generator 102 is preferably the same as the wavelength band of the main signal or wider than this wavelength band. In this embodiment, the light (dummy signal light) inserted into the main signal is not limited to being the ASE light as long as its optical spectrum is known. That is, the light source of the dummy signal light is not limited to being the ASE generator 102.

The optical dividers 104-1 and 104-2 are arranged to correspond to the respective light output ports on the output side of the wavelength selective switch 101. The optical dividers 104-1 and 104-2 each branch the optical signal output from the wavelength selective switch 101 at a predetermined division ratio. The optical wavelength tunable filter 105-1 and the light intensity detector 106-1 are arranged in the subsequent stage of the optical divider 104-1 that corresponds to one light output port (first light output port). The optical wavelength tunable filter 105-1 is an optical bandpass filter configured in such a way that the center wavelength of the light that is transmitted therethrough can be changed. The light intensity detector 106-1 detects the intensity of the light that has been transmitted through the optical wavelength tunable filter 105-1.

The optical wavelength tunable filter 105-2 and the light intensity detector 106-2 are arranged in the subsequent stage of the optical divider 104-2 that corresponds to the other light output port (second light output port). The optical wavelength tunable filter 105-2 is an optical bandpass filter configured in such a way that the center wavelength of the light that is transmitted therethrough can be changed. The light intensity detector 106-2 detects the intensity of the light that has passed through the optical wavelength tunable filter 105-2. A photo detector (PD) is, for example, used as the light intensity detectors 106-1 and 106-2. The optical wavelength tunable filters 105-1 and 105-2 and the light intensity detectors 106-1 and 106-2 each correspond to the light intensity monitor 14 in FIG. 1.

When the wavelength selective switch 101 includes three or more light output ports, the optical transmission system 100 may include a set of the optical divider 104, the optical wavelength tunable filters 105, and the light intensity detectors 106 corresponding to the respective light output ports of the wavelength selective switch. Instead of providing the set of the optical divider 104, the optical wavelength tunable filters 105, and the light intensity detectors 106 for the respective light output ports, the light output port to be measured may be selected using a set of the optical wavelength tunable filter 105 and the light intensity detector 106 and an optical switch that selectively inputs the light output from the plurality of light output ports of the wavelength selective switch 101 to the optical wavelength tunable filter 105.

It is desirable that the ASE light be multiplexed with the main signal at an intensity that does not affect the reception of the main signal. The power of the ASE light output from the ASE generator 102 is, for example, set in advance to a value that does not affect the traffic. Alternatively, a variable optical attenuator may be arranged in the stage subsequent to the ASE generator 102, and the power of the ASE light multiplexed in the optical multiplexer 103 may be adjusted using the variable optical attenuator. Specifically, the power of the ASE light may be adjusted by gradually increasing the amount of attenuation in the variable optical attenuator while monitoring the bit error rate (BER) of the main signal with which the ASE light has been multiplexed. Alternatively, it may be possible to adjust the power of the ASE light to a minimum power at which the light intensity detector 106-1 or 106-2 is able to detect the change in the intensity before and after the ASE light is inserted by gradually increasing the amount of attenuation in the variable optical attenuator.

The controller 110 performs, for example, control of each component, and operations on a detection signal. The control executed by the controller 110 includes control of the ASE generator 102 and control of the insertion loss (additional insertion loss) for each wavelength in the wavelength selective switch 101. The controller 110 controls the insertion of the ASE light into the main signal and the release of this insertion. The controller 110 controls the insertion of the ASE light into the main signal and the release of this insertion by instructing, for example, the ASE generator 102 to turn an optical output ON/OFF. Alternatively, when an optical shutter is arranged between the ASE generator 102 and the optical multiplexer 103, the controller 110 may control the insertion of the ASE light into the main signal and the release of this insertion by controlling transmission/interruption of the optical shutter.

The light intensity detectors 106-1 and 106-2 each detect the light intensity both in the state in which the main signal into which the ASE light has been inserted is input to the wavelength selective switch 101 and the state in which the main signal into which the AES light is not inserted is input to the wavelength selective switch 101. The controller 110 acquires the first light intensity detected in the state in which the ASE light in inserted into the main signal from the light intensity detectors 106-1 and 106-2. Further, the controller 110 acquires the second light intensity detected in the state in which the ASE light is not inserted into the main signal from the light intensity detectors 106-1 and 106-2. The controller 110 controls the transmission wavelengths of the optical wavelength tunable filters 105-1 and 105-2 in such a way that the light intensity is detected for each wavelength in the light intensity detectors 106-1 and 106-2 when it acquires the first light intensity and the second light intensity.

The acquisition of the first light intensity is executed, for example, in accordance with the following procedure. The controller 110 causes the ASE generator 102 to generate the ASE light and causes the optical multiplexer 103 to insert the ASE light into the main signal. The controller 110 sets the transmission center wavelength of the optical wavelength tunable filter 105-1 to a predetermined wavelength (start wavelength). The controller 110 receives, from the light intensity detector 106-1, the light intensity that has been detected. The controller 110 shifts the transmission center wavelength of the optical wavelength tunable filter 105-1 by the amount corresponding to the wavelength unit of the wavelength selective switch 101 (the main signal). The controller 110 repeatedly executes the shift of the transmission center wavelength of the optical wavelength tunable filter 105-1 and the reception of the light intensity output from the light intensity detector 106-1 for the entire bandwidth of the main signal output from the first light output port. The controller 110 executes the aforementioned processing also for the other light output ports of the wavelength selective switch 101. According to this operation, the light intensity (first light intensity) of the optical signal for each wavelength unit of the main signal that has passed through the wavelength selective switch in the state in which the ASE light is inserted is accumulated in the controller 110.

The acquisition of the second light intensity is similar to the acquisition of the first light intensity except that the generation of the ASE light in the ASE generator 102 is stopped and the ASE light is not inserted into the main signal in the optical multiplexer 103. The controller 110 does not cause the ASE generator 102 to output the ASE light and does not cause the optical multiplexer 103 to insert the ASE light into the main signal. The controller 110 sets the transmission center wavelength of the optical wavelength tunable filter 105-1 to the predetermined wavelength (start wavelength). The controller 110 receives, from the light intensity detector 106-1, the light intensity that has been detected. The controller 110 shifts the transmission center wavelength of the optical wavelength tunable filter 105-1 by the amount corresponding to the wavelength unit of the main signal. The controller 110 repeatedly executes the shift of the transmission center wavelength of the optical wavelength tunable filter 105-1 and the reception of the light intensity output from the light intensity detector 106-1 for the entire bandwidth of the main signal output from the first light output port. The controller 110 executes the aforementioned processing also for the other light output ports of the wavelength selective switch 101. According to this operation, the light intensity (second light intensity) of the optical signal for each wavelength unit of the main signal that has passed through the wavelength selective switch in the state in which the ASE light is not inserted is accumulated in the controller 110.

The controller 110 calculates the difference between the first light intensity and the second light intensity that have been acquired for each wavelength unit. The controller 110 calculates the insertion loss for each wavelength unit in the wavelength selective switch 101 based on the result of the calculation of the difference between the first light intensity and the second light intensity. The controller 110 controls the insertion loss for each wavelength unit in the wavelength selective switch 101 based on the calculated insertion loss. In this embodiment, the controller 110 functions as the difference calculator 15, the insertion loss calculator 16, the insertion loss controller 17, and the light source controller 18 shown in FIG. 1.

Figure 3A:
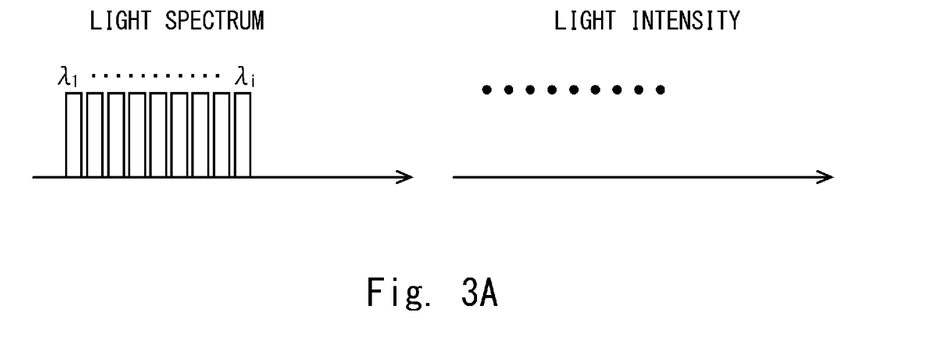
FIG. 3A is a diagram showing a light spectrum and a light intensity of a main signal that has passed a wavelength selective switch.
Figure 3B:
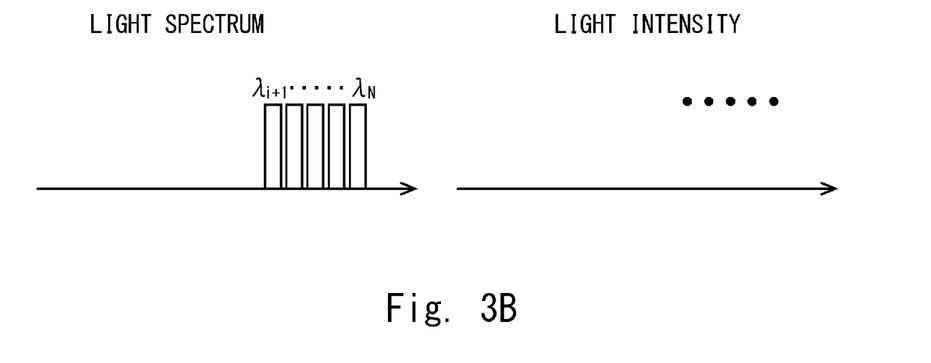
FIG. 3B is a diagram showing a light spectrum and a light intensity of the main signal that has passed through the wavelength selective switch.

FIGS. 3A and 3B each show the light spectrum and the light intensity of the main signal that has passed through the wavelength selective switch 101. It is assumed that the main signal includes optical signals from wavelengths $\lambda_1$ to $\lambda_N$, where N is an integer equal to or greater than two. It is further assumed that the wavelength selective switch 101 outputs, for example, the optical signals from the wavelengths $\lambda_1$ to $\lambda_i$ from the first light output port (see FIG. 3A) and outputs the optical signals from the wavelengths $\lambda_{i+1}$ to $\lambda_N$ from the second light output port (see FIG. 3B), where i is an integer smaller than N. In this example, it is assumed that the light spectrum of the main signal is flat and the insertion loss characteristics of the wavelength selective switch 101 do not have a wavelength dependency at the timing when the main signal is input to the wavelength selective switch 101. In this case, the light spectrum of the main signal that has passed through the wavelength selective switch 101 is flat, and the light intensities detected in the light intensity detectors 106-1 and 106-2 are not changed depending on the wavelength and become constant.

Figure 4A:
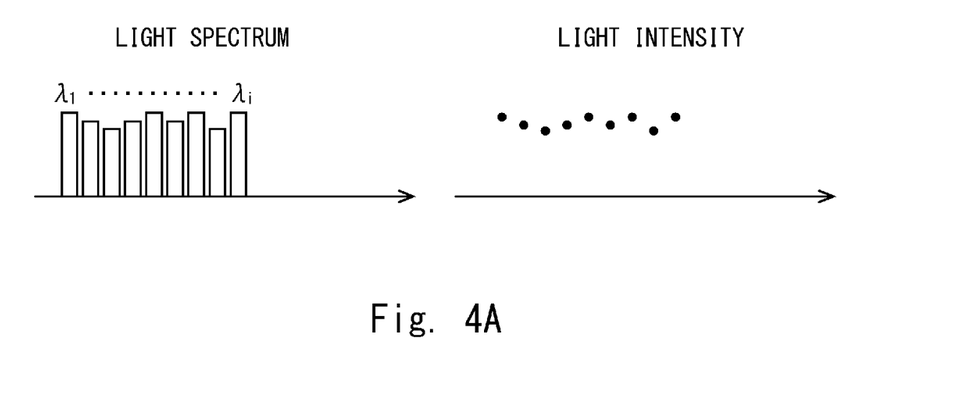
FIG. 4A is a diagram showing a light spectrum and a light intensity of the main signal that has passed through the wavelength selective switch.
Figure 4B:
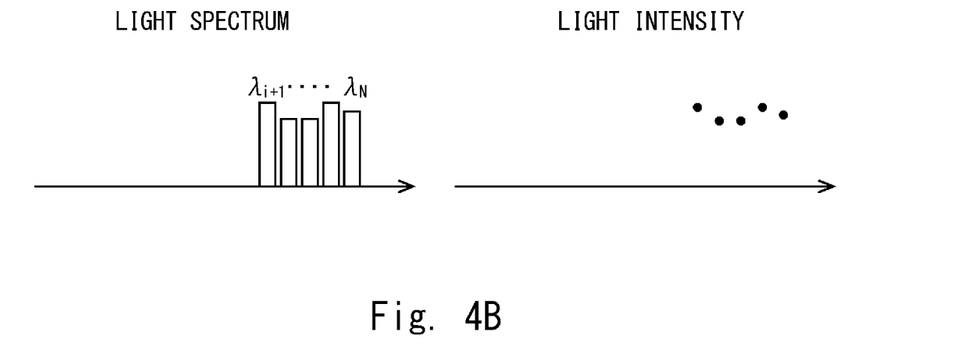
FIG. 4B is a diagram showing a light spectrum and a light intensity of the main signal that has passed through the wavelength selective switch.

FIGS. 4A and 4B each show the light spectrum and the light intensity of the main signal that has passed through the wavelength selective switch 101 when the insertion loss characteristics of the wavelength selective switch 101 have a wavelength dependency. When the insertion loss characteristics of the wavelength selective switch 101 have a wavelength dependency, the attenuation that the optical signal of each wavelength included in the main signal receives is changed depending on the wavelength of the optical signal. Therefore, even when the light spectrum of the main signal is flat at the timing when the main signal is input to the wavelength selective switch 101, as shown in FIGS. 4A and 4B, the light spectrum of the main signal that has passed through the wavelength selective switch 101 does not become flat. Further, the light intensities detected in the light intensity detectors 106-1 and 106-2 are changed depending on the wavelength, and do not become constant.

Figure 5A:
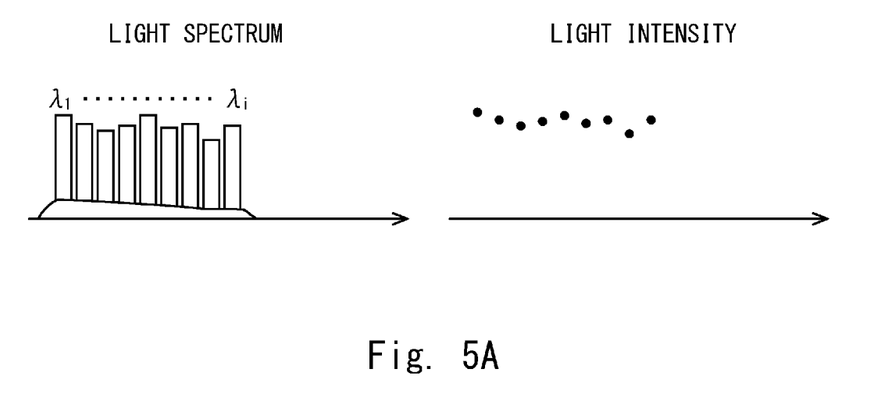
FIG. 5A is a diagram showing a light spectrum and a light intensity of the main signal into which an ASE light that has passed through the wavelength selective switch is inserted.
Figure 5B:
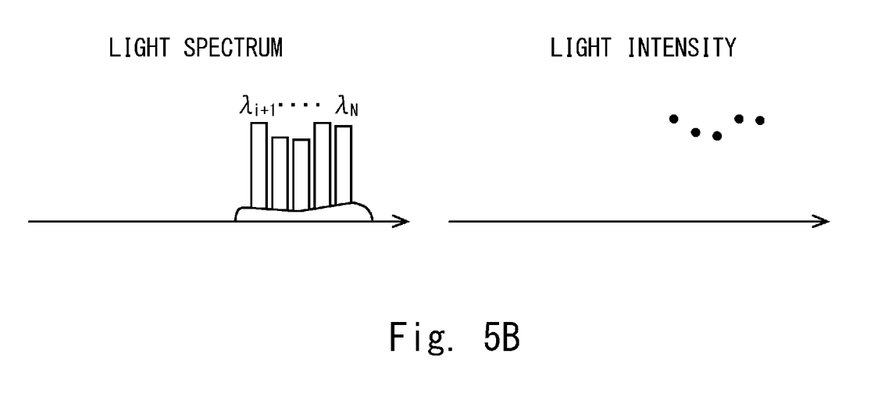
FIG. 5B is a diagram showing a light spectrum and a light intensity of the main signal into which the ASE light that has passed through the wavelength selective switch is inserted.

FIGS. 5A and 5B each show the light spectrum and the light intensity of the main signal passed through the wavelength selective switch 101, into which the ASE light is inserted. The ASE light has a wavelength band wider than the wavelengths $\lambda_1$ to $\lambda_N$, which are the wavelength band of the main signal. The wavelength components of the wavelengths $\lambda_1$ to $\lambda_i$ of the ASE light are output from the first light output port of the wavelength selective switch 101 (see FIG. 5A), and the wavelength components of the wavelengths $\lambda_{i+1}$ to $\lambda_N$ are output from the second light output port (see FIG. 5B). It is assumed that the light spectrum of the ASE light does not change depending on the environmental temperature. When the ASE light is inserted into the main signal, the intensity of the light detected in the light output port of the wavelength selective switch 101 is increased compared to that before the ASE light is inserted into the main signal by an amount that corresponds to the intensity of the ASE light that has been inserted.

In this embodiment, in order to estimate the wavelength dependency of the insertion loss characteristics of the wavelength selective switch 101, the controller 110 acquires the light intensity detected for each wavelength unit of the main signal both in the state in which the ASE light in inserted into the main signal and in the state in which the ASE light is not inserted into the main signal. The controller 110 calculates the light intensity of each wavelength of the ASE light that has passed through the wavelength selective switch 101 by subtracting the light intensity of each wavelength of the main signal into which the ASE light has not been inserted from the light intensity of each wavelength of the main signal into which the ASE light has been inserted. When the optical spectrum of the ASE light multiplexed with the main signal by the optical multiplexer 103 is known, it is possible to estimate the wavelength dependency of the insertion loss characteristics in the wavelength selective switch 101 by comparing the known optical spectrum with the optical spectrum of the ASE light that has passed through the wavelength selective switch 101.

Figure 6A:
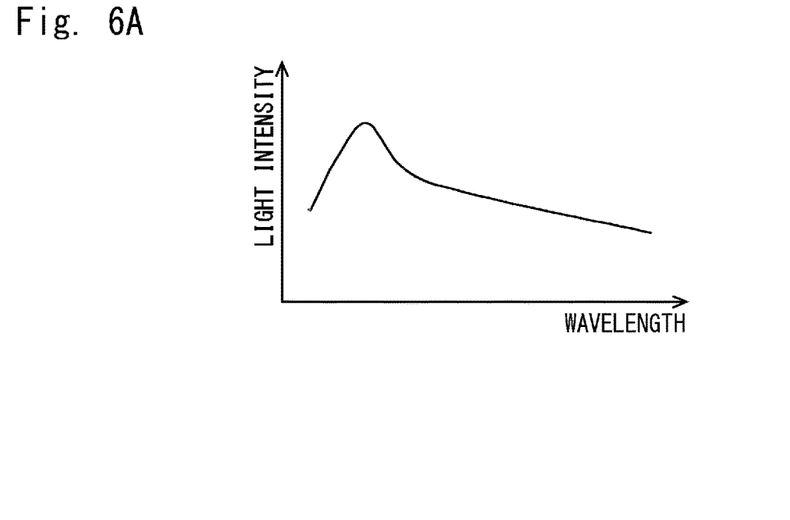
FIG. 6A is a graph showing a light spectrum of the ASE light to be inserted into the main signal.
Figure 6B:
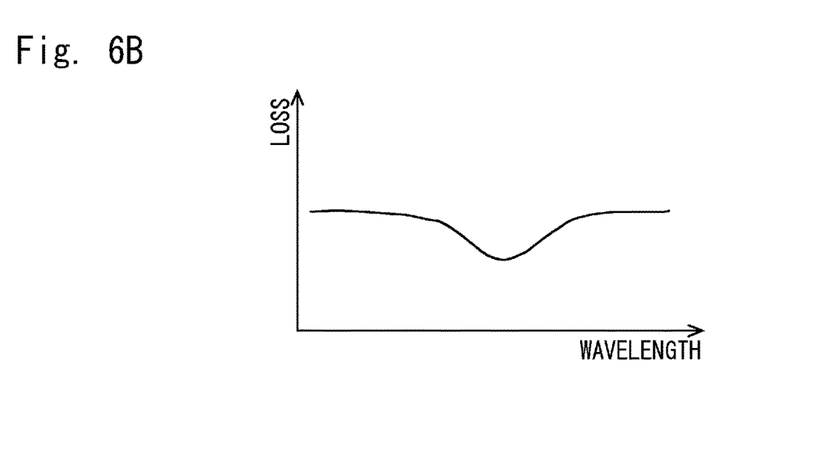
FIG. 6B is a graph showing a wavelength dependency of an insertion loss of the wavelength selective switch.
Figure 6C:
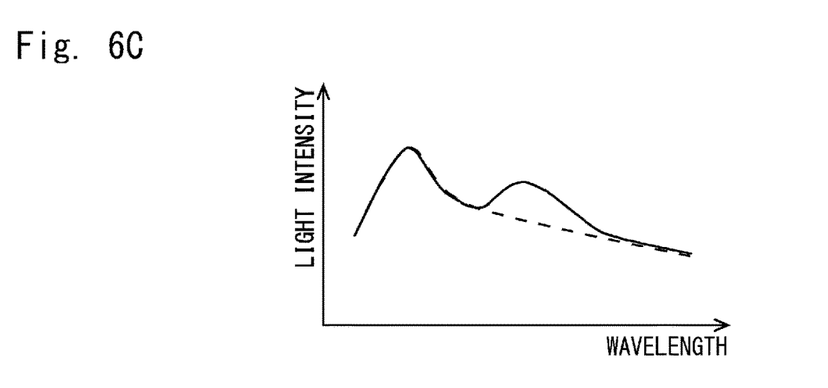
FIG. 6C is a graph showing a light spectrum of the ASE light that has passed through the wavelength selective switch.

FIG. 6A shows the light spectrum of the ASE light inserted into the main signal, FIG. 6B shows the wavelength dependency of the insertion loss of the wavelength selective switch 101, and FIG. 6C shows the light spectrum of the ASE light that has passed through the wavelength selective switch 101. In FIGS. 6A and 6C, the horizontal axis indicates the wavelength and the vertical axis indicates the light intensity. Further, in FIG. 6B, the horizontal axis indicates the wavelength and the vertical axis indicates the loss.

When the ASE light that has the optical spectrum shown in FIG. 6A is input to the wavelength selective switch 101 having the wavelength dependency of the loss characteristic shown in FIG. 6B, the wavelength selective switch 101 outputs the ASE light of the optical spectrum shown in FIG. 6C. When the optical spectrum shown in FIG. 6A is known, it is possible to estimate the wavelength dependency of the insertion loss shown in FIG. 6B based on the optical spectrum shown in FIG. 6C. By controlling the additional insertion loss of each wavelength of the wavelength selective switch 101 in such a way as to cancel the wavelength dependency that has been estimated, the attenuation of the optical signal of each wavelength included in the main signal can be made uniform among the wavelengths.

Figure 7:
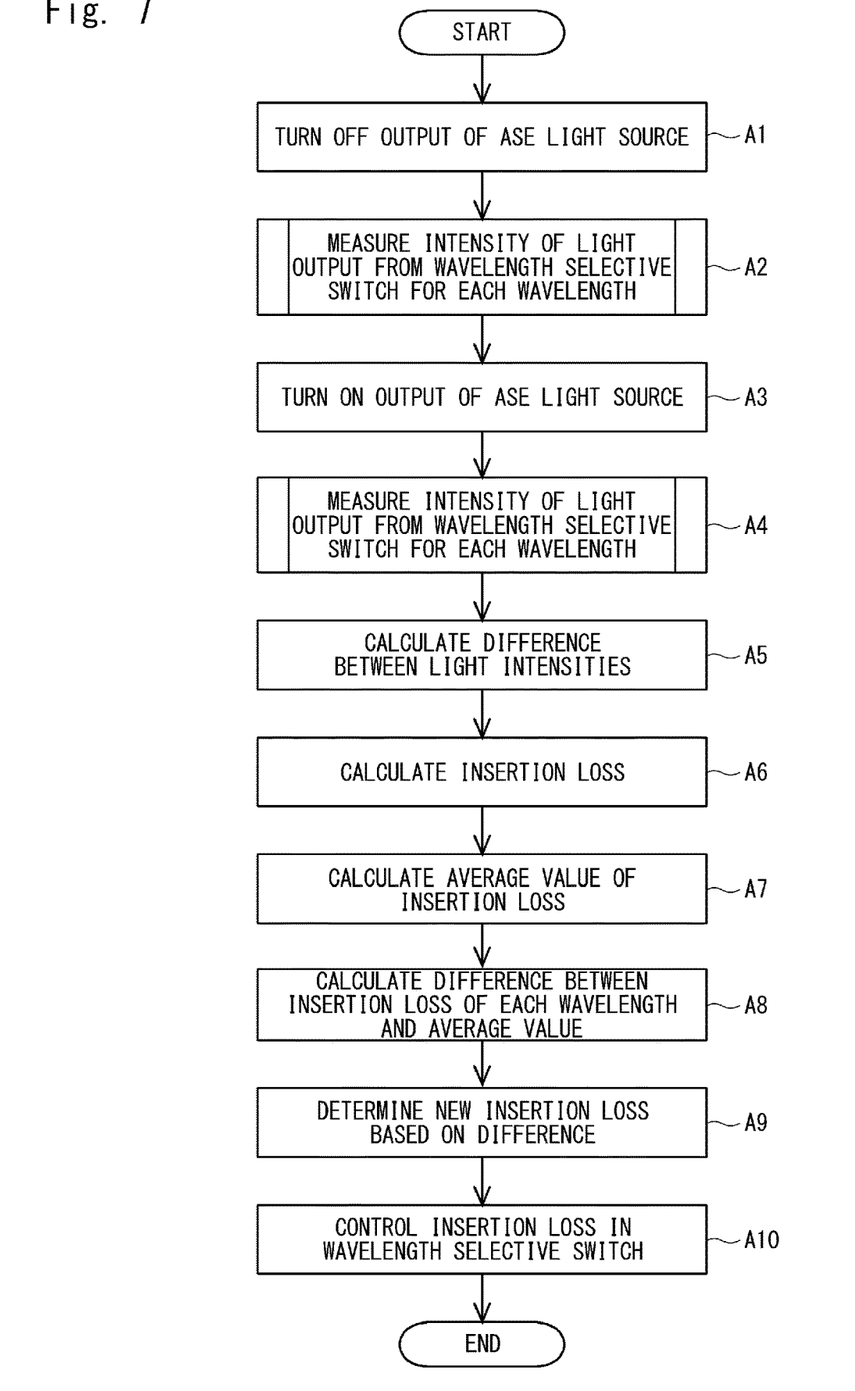
FIG. 7 is a flowchart showing a procedure of an insertion loss correction in the optical transmission system.

Next, an operation procedure will be explained. FIG. 7 shows a procedure of the insertion loss correction in the optical transmission system 100. The controller 110 first acquires, as a reference, light intensity information of the main signal that has passed through the wavelength selective switch 101 in the state in which the ASE light is not inserted. The controller 110 causes the ASE generator 102 to stop the output of the ASE light (Step A1). The controller 110 measures the intensity of the light output from the wavelength selective switch 101 for each wavelength using the optical wavelength tunable filters 105-1 and 105-2 and the light intensity detectors 106-1 and 106-2 (Step A2).

Figure 8:
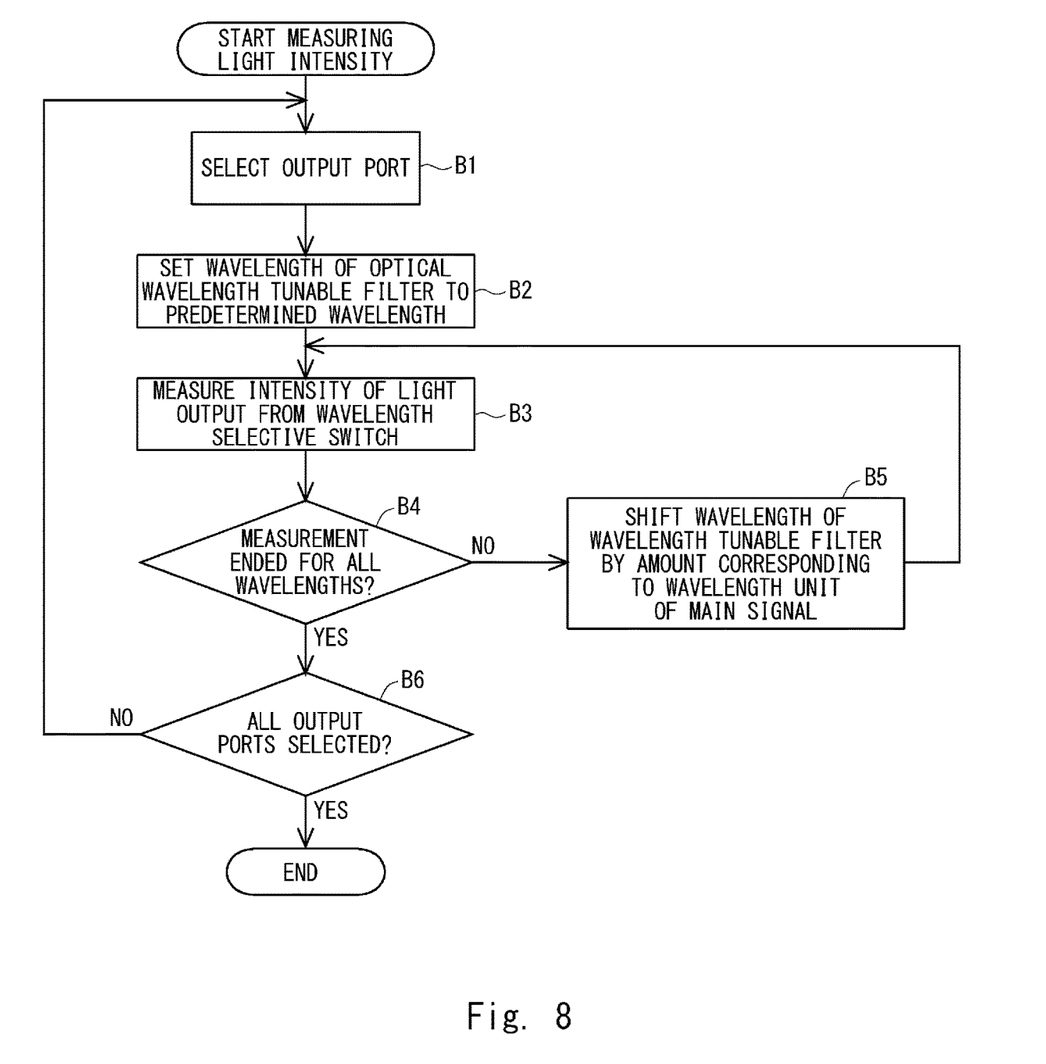
FIG. 8 is a flowchart showing a procedure for measuring an intensity of a light output from the wavelength selective switch.

FIG. 8 shows a procedure for measuring the intensity of the light output from the wavelength selective switch 101 in Step A2. The controller 110 selects one of the plurality of light output ports of the wavelength selective switch 101 (Step B1). The controller 110 first selects, for example, the first light output port in Step B1. The controller 110 sets the transmission center wavelength of the optical wavelength tunable filter 105-1 that corresponds to the first light output port that has been selected to the predetermined wavelength (start wavelength) (Step B2). The controller 110 sets, in Step B2, the transmission center wavelength of the optical wavelength tunable filter 105-1 to, for example, the shortest wavelength $\lambda_1$ (see FIG. 3A etc.) among the wavelengths of the optical signal included in the main signal.

The light intensity detector 106-1 measures the intensity of the output light of the wavelength selective switch 101 input through the optical wavelength tunable filter 105-1 (Step B3). The light intensity detector 106 measures, in Step B3, the intensity of the light of the wavelength components set in Step B2 included in the light output from the first light output port of the wavelength selective switch 101. The controller 110 receives the light intensity measured in the light intensity detector 106, and stores this light intensity in association with the wavelength.

The controller 110 determines whether the measurement has been ended for all the wavelengths (Step B4). When there still remain wavelengths for which the measurement has not yet been performed, the controller 110 shifts the transmission center wavelength of the optical wavelength tunable filter 105-1 by the amount corresponding to the wavelength unit of the main signal (Step B5). The controller 110 shifts, for example, the transmission center wavelength of the optical wavelength tunable filter 105-1 from the wavelength $\lambda_1$ to the wavelength $\lambda_2$ in Step B5. After that, the process goes back to Step B3, where the light intensity detector 106-1 measures the intensity of the output light of the wavelength selective switch 101 input through the optical wavelength tunable filter 105-1. The controller 110 causes Steps B3 to B5 to be repeatedly executed until the time it is determined that the measurement has been ended for all the wavelengths in Step B4.

The controller 110 determines that the measurement has been ended for all the wavelengths in Step B4 when it determines, for example, that the measurement has been ended for the wavelengths $\lambda_1$ to $\lambda_i$ of the optical signal output from the first light output port. When it is determined that the measurement for all the wavelengths has been ended in Step B4, the controller 110 determines whether the processing has been executed for all the light output ports of the wavelength selective switch 101 (Step B6). When there remains a light output port that has not yet been selected, the process goes back to Step B1, where the controller 110 selects the second light output port. After that, the controller 110 sets the transmission center wavelength of the optical wavelength tunable filter 105-2 that corresponds to the second light output port to the predetermined wavelength (start wavelength) in Step B2.

The controller 110 sets, in Step B2, the transmission center wavelength of the optical wavelength tunable filter 105-2 to, for example, the shortest wavelength $\lambda_{i+1}$ (see FIG. 3B etc.) among the wavelengths of the light output from the second light output port. The light intensity detector 106-2 measures the intensity of the output light of the wavelength selective switch 101 input through the optical wavelength tunable filter 105-2 in Step B3. In the following processing, similar to the processing for the first light output port, the controller 110 causes Steps B3 to B5 to be repeatedly executed until the time it is determined that the measurement has been ended for all the wavelengths in Step B4. When it is determined in Step B6 that there is no light output port that has not yet been selected, the controller 110 ends the processing.

Referring back to FIG. 7, the controller 110 acquires the light intensity information of the main signal that has passed through the wavelength selective switch 101 in the state in which the ASE light is inserted. The controller 110 causes the ASE generator 102 to output the ASE light (Step A3). The controller 110 measures the intensity of the light output from the wavelength selective switch 101 for each wavelength using the optical wavelength tunable filters 105-1 and 105-2 and the light intensity detectors 106-1 and 106-2 (Step A4). The measurement in Step A4 is similar to the measurement in Step A2 described with reference to FIG. 8 except for the point that the ASE light is inserted into the main signal. It is appreciated that either measurement of the light intensity of the main signal into which the ASE light has not been inserted and the measurement of the light intensity of the main signal into which the ASE light has been inserted may be executed first.

The controller 110 calculates the difference between the light intensity of the light output from the wavelength selective switch 101 measured for each wavelength in Step A2 and the light intensity of the light output from the wavelength selective switch 101 measured for each wavelength in Step A4 (Step A5). The controller 110 subtracts, in Step A5, the light intensity of the light output from the wavelength selective switch 101 in the state in which the ASE light is not inserted measured in Step A2 from the light intensity of the light output from the wavelength selective switch 101 in the state in which the ASE light is inserted measured in Step A4. The difference between the light intensities that has been calculated for the respective wavelengths in Step A5 corresponds to the optical spectrum of the ASE light that has passed through the wavelength selective switch 101.

The controller 110 calculates the insertion loss of the wavelength selective switch 101 for each wavelength based on the difference calculated in Step A5 (Step A6). The controller 110 compares, in Step A6, for example, the known optical spectrum of the ASE light with the optical spectrum of the ASE light that has passed through the wavelength selective switch 101 calculated in Step A5, thereby calculating the insertion loss of the wavelength selective switch 101 for each wavelength.

The controller 110 calculates the average value of the insertion loss of each wavelength calculated in Step A6 (Step A7). The controller 110 calculates the difference between the insertion loss of each wavelength calculated in Step A6 and the average value of the insertion loss calculated in Step A7 (Step A8). The controller 110 determines the control amount (set value) of the additional insertion loss of the wavelength selective switch 101 to be newly set based on the difference calculated in Step A8 (Step A9). The controller 110 adds, in Step A9, for example, the difference calculated in Step A8 to the current additional insertion loss of the wavelength selective switch 101, thereby determining a new set value of the additional insertion loss. Instead of calculating the difference between the insertion loss of each wavelength and the average value, the difference between the insertion loss of each wavelength calculated in Step A6 and the desired profile of the insertion loss may be calculated, and the new control amount of the insertion loss may be determined based on this difference.

The controller 110 controls the additional insertion loss of each wavelength in the wavelength selective switch 101 by the control amount determined in Step A9 (Step A10). The aforementioned processing can be executed while the optical transmission system 100 is transmitting the main signal using the wavelength selective switch 101. In the optical transmission system 100, the processing from Steps A1 to A10 is executed, for example, periodically or every time the change in the environmental temperature is detected, and thus the wavelength dependency of the insertion loss of the wavelength selective switch 101 is corrected in service.

In this embodiment, the controller 110 causes the light intensity of the output light to be measured on the output side of the wavelength selective switch 101 in the state in which the ASE light is inserted into the main signal on the input side of the wavelength selective switch 101. Further, the controller 110 causes the light intensity of the output light to be measured on the output side of the wavelength selective switch 101 in the state in which the ASE light is not inserted into the main signal on the input side of the wavelength selective switch 101. The controller 110 calculates the difference between the light intensity of the light output from the wavelength selective switch 101 before the ASE light is inserted into the main signal and the light intensity of the light output from the wavelength selective switch 101 after the ASE light is inserted into the main signal. By calculating this difference, the component of the main signal is removed from the light output from the wavelength selective switch 101, and the light spectrum of the ASE light that has passed through the wavelength selective switch 101 is obtained. By comparing this light spectrum with the light spectrum of the ASE light inserted into the main signal, the wavelength dependency of the insertion loss of the wavelength selective switch 101 can be estimated.

According to this embodiment, the additional insertion loss of the wavelength selective switch 101 is controlled based on the estimated wavelength dependency of the insertion loss of the wavelength selective switch 101, whereby it is possible to correct the insertion loss deviation for each wavelength unit of the wavelength selective switch 101 with a high accuracy. Alternatively, it is possible to control the wavelength dependency of the insertion loss of the wavelength selective switch 101 to a desired profile. Further, according to this embodiment, it is possible to correct the insertion loss deviation for each wavelength unit of the wavelength selective switch 101 without depending on the environmental temperature. Furthermore, even when the wavelength dependency of the insertion loss of the wavelength selective switch 101 is changed due to aged deterioration and the like, it is possible to correct the insertion loss deviation for each wavelength unit of the wavelength selective switch 101.

Figure 9:
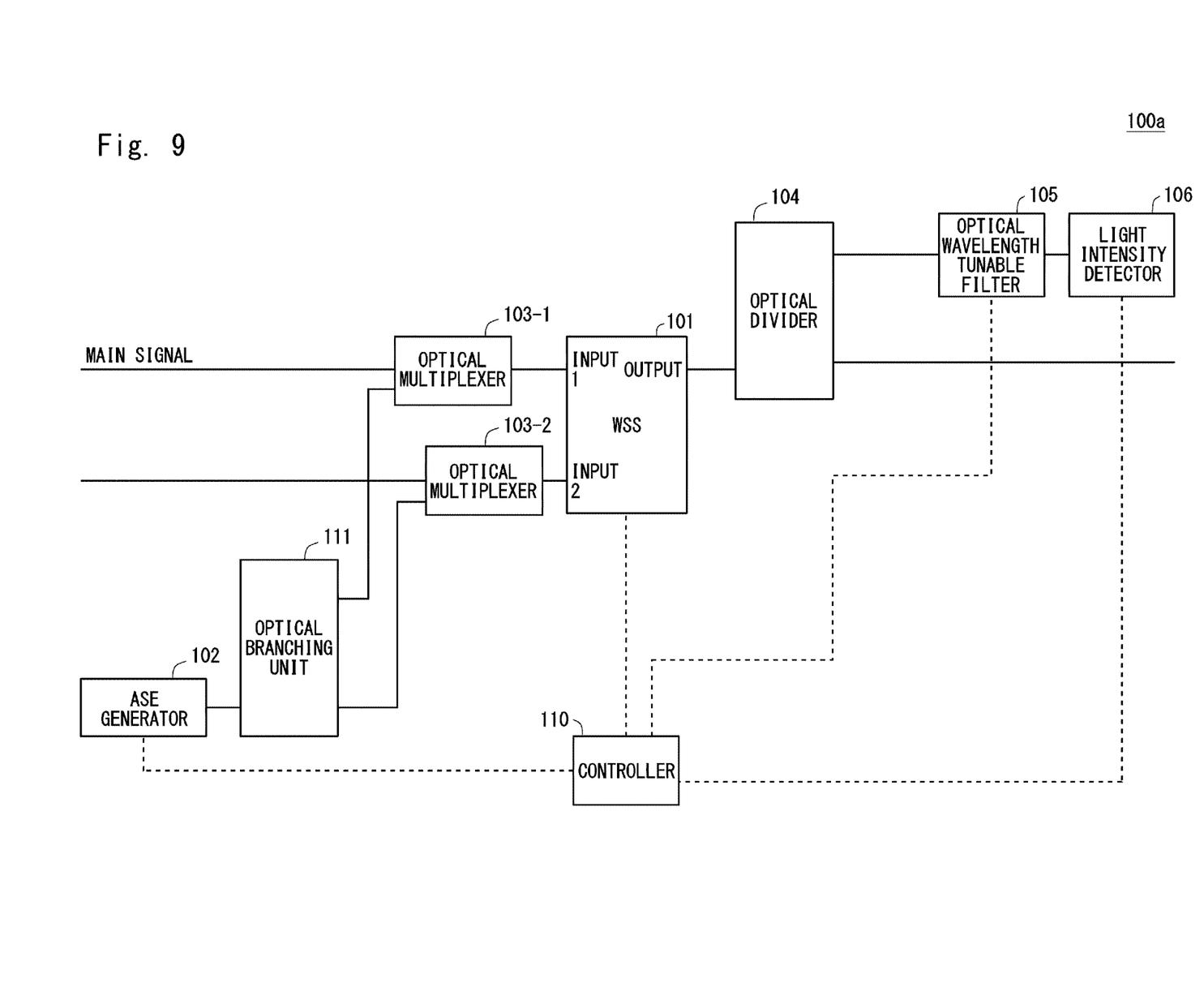
FIG. 9 is a block diagram showing an optical transmission system according to a modified example.

While the wavelength selective switch 101 includes one light input port in FIG. 2, the wavelength selective switch 101 may include a plurality of light input ports. FIG. 9 shows an optical transmission system according to a modified example. In this example, the wavelength selective switch 101 includes two light input ports and one light output port.

An optical transmission system 100a according to a modified example includes, besides the components of the optical transmission system 100 according to one embodiment shown in FIG. 2, an optical divider 111. The optical divider 111 branches the ASE light output from the ASE generator 102 so that it corresponds to the two light input ports. An optical multiplexer 103-1, which is arranged so as to correspond to the first light input port, inserts the ASE light into the first main signal to be input to the first light input port. An optical multiplexer 103-2, which is arranged so as to correspond to the second light input port, inserts the ASE light into the main signal to be input to the second light input port.

The structure on the output side of the wavelength selective switch 101 is similar to the structure in the optical transmission system 100 according to one embodiment shown in FIG. 2 except that only one light output port is provided. The wavelength dependency of the insertion loss of the wavelength selective switch 101 can be estimated in a procedure similar to that described in the aforementioned embodiment. Therefore, the effects to be obtained are also similar to those obtained in the aforementioned embodiment.

Figure 10:
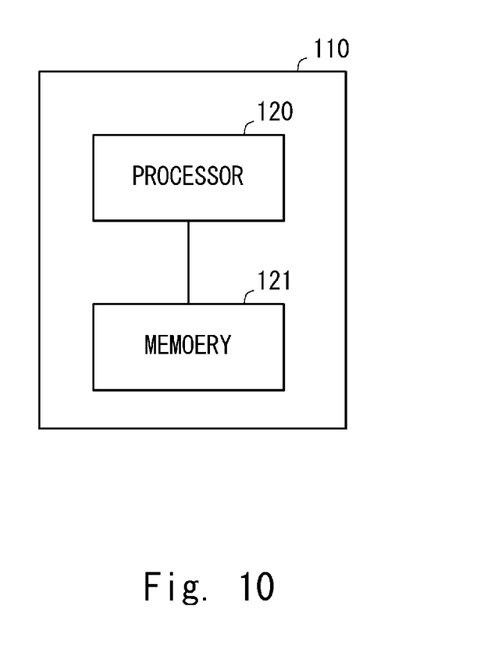
FIG. 10 is a block diagram showing a configuration example of a controller.

In the aforementioned embodiment, the functions of the controller 110 may be achieved, for example, by a processor included in the controller operating in accordance with a predetermined program. FIG. 10 shows a configuration example of the controller. The controller 110 includes a processor 120 and a memory 121. The memory 121 includes a volatile memory and/or a non-volatile memory. The memory 121 stores a software (computer program) to be executed on the processor 120 in, for example, the non-volatile memory. The processor 120 is, for example, a Central Processing Unit (CPU) or the like, and the control and the operations executed by the controller 110 are achieved by, for example, the processor 120 operating in accordance with the computer program loaded from the memory 121. The processor 120 may load the computer program from an external memory of the controller 110 and execute the loaded computer program instead of loading the computer program from the memory 121 in the controller 110.

While the embodiment of the present disclosure has been described in detail, the present disclosure is not limited to the aforementioned embodiment and a modification or a correction of the aforementioned embodiment without departing from the spirit of the present disclosure may also be included within the scope of the present disclosure.

This application is based upon and claims the benefit of priority from Japanese Patent Application No. 2016-046558, filed on Mar. 10, 2016, the disclosure of which is incorporated herein in its entirety by reference.

REFERENCE SIGNS LIST

10: OPTICAL TRANSMISSION SYSTEM
11: WAVELENGTH SELECTIVE SWITCH
12: LIGHT SOURCE
13: MULTIPLEXER
14: LIGHT INTENSITY MONITOR
15: DIFFERENCE CALCULATOR
16: INSERTION LOSS CALCULATOR
17: INSERTION LOSS CONTROLLER
18: LIGHT SOURCE CONTROLLER
100: OPTICAL TRANSMISSION SYSTEM
101: WAVELENGTH SELECTIVE SWITCH
102: ASE GENERATOR
103: OPTICAL MULTIPLEXER
104: OPTICAL DIVIDER
105: OPTICAL WAVELENGTH TUNABLE FILTER
106: LIGHT INTENSITY DETECTOR
110: CONTROLLER
111: OPTICAL DIVIDER
120: PROCESSOR
121: MEMORY

The invention claimed is:

1. An optical transmission apparatus comprising:
a light source configured to output a dummy signal light with a first spectrum, the dummy signal light being multiplexed to a main signal;
a light source controller configured to control output of the dummy light from the light source;
a multiplexer configured to output the main signal when the light source does not output the dummy light, and to output a multiplexed optical signal including the dummy signal light and the main signal when the light source outputs the dummy signal;

a wavelength selective switch configured to attenuate the main signal with an attenuation amount corresponding to each of wavelengths and output the attenuated main signal when the multiplexer outputs the main signal, and to attenuate the multiplexed optical signal with the attenuation amount and output the attenuated multiplexed optical signal when the multiplexer outputs the multiplexed optical signal;

a difference calculator configured to obtain a second spectrum by calculating a difference between a first light intensity of the attenuated multiplexed optical signal and a second light intensity of the attenuated main signal; and a controller configured to control the attenuation amount according to a difference between the first spectrum and second spectrum in such a way as to cancel wavelength dependency of the attenuation amount.

2. The optical transmission apparatus according to claim 1, wherein the light source is a spontaneous emission light source.

3. The optical transmission apparatus according to claim 1, wherein the dummy signal light is multiplexed with the main signal at an intensity that does not affect reception characteristics of the main signal.

4. The optical transmission apparatus according to claim 1, wherein the wavelength selective switch includes a plurality of light output ports and wherein a plurality of light intensity monitors are provided to correspond to the plurality of respective light output ports.

5. The optical transmission apparatus according to claim 1, wherein the wavelength selective switch includes a plurality of light input ports and a plurality of multiplexers are provided to correspond to the plurality of respective light input ports, and wherein the optical transmission apparatus further comprises an optical divider configured to branch a dummy signal light output from the light source corresponding to the plurality of light input ports.

6. The optical transmission apparatus according to claim 4, wherein the light intensity monitor comprises:

a wavelength tunable filter capable of changing the wavelength of a light to be transmitted therethrough; and a photodetector configured to detect intensity of the light that has been transmitted through the wavelength tunable filter.

7. The optical transmission apparatus according to claim 1, wherein the dummy signal light has a wavelength band the same as or wider than a wavelength band of the main signal.

8. An optical transmission system comprising:

a light source configured to output a dummy signal light with a first spectrum, the dummy signal light being multiplexed to a main signal;

a light source controller configured to control output of the dummy light from the light source;

a multiplexer configured to output the main signal when the light source does not output the dummy light, and to output a multiplexed optical signal including the dummy signal light and the main signal when the light source outputs the dummy signal;

a wavelength selective switch configured to attenuate the main signal with an attenuation amount corresponding to each of wavelengths and output the attenuated main signal when the multiplexer outputs the main signal, and to attenuate the multiplexed optical signal with the attenuation amount and output the attenuated multiplexed optical signal when the multiplexer outputs the multiplexed optical signal;

a difference calculator configured to obtain a second spectrum by calculating a difference between a first light intensity of the attenuated multiplexed optical signal and a second light intensity of the attenuated main signal; and a controller configured to control the attenuation amount according to a difference between the first spectrum and second spectrum in such a way as to cancel wavelength dependency of the attenuation amount.

9. An optical transmission method comprising:

outputting a dummy signal light with a first spectrum, the dummy signal light being multiplexed to a main signal;

controlling output of the dummy light;

outputting the main signal when the dummy signal light is not output and outputting a multiplexed optical signal including the dummy signal light and the main signal when the dummy signal is output;

attenuating the main signal with an attenuation amount corresponding to each of wavelengths and outputting the attenuated main signal when the main signal is output, and to attenuate the multiplexed optical signal with the attenuation amount and output the attenuated multiplexed optical signal when the multiplexed optical signal is output;

obtaining a second spectrum by calculating a difference between a first light intensity of the attenuated multiplexed optical signal and a second light intensity of the attenuated main signal; and controlling the attenuation amount according to a difference between the first spectrum and the second spectrum in such a way as to cancel wavelength dependency of the attenuation amount.

* * * * *